(12) United States Patent
Hwang

(10) Patent No.: US 11,964,649 B2
(45) Date of Patent: Apr. 23, 2024

(54) VEHICLE BRAKE SYSTEM AND METHOD OF OPERATING THEREOF

(71) Applicant: HYUNDAI MOBIS CO., LTD., Seoul (KR)

(72) Inventor: Woo Hyun Hwang, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 424 days.

(21) Appl. No.: 17/316,999

(22) Filed: May 11, 2021

(65) Prior Publication Data
US 2021/0347345 A1    Nov. 11, 2021

(30) Foreign Application Priority Data

May 11, 2020    (KR) .................. 10-2020-0055788

(51) Int. Cl.
*B60T 8/88*    (2006.01)
*B60T 13/74*    (2006.01)

(52) U.S. Cl.
CPC ............ *B60T 8/885* (2013.01); *B60T 13/745* (2013.01); *B60T 2270/402* (2013.01); *B60T 2270/413* (2013.01)

(58) Field of Classification Search
CPC ..... B60T 8/17; B60T 8/22; B60T 8/88; B60T 8/885; B60T 13/74; B60T 13/745;
(Continued)

(56) References Cited

U.S. PATENT DOCUMENTS 6,390,571 B1 * 5/2002 Murphy ................. B60T 13/662
                                                                303/14
2002/0167218 A1 * 11/2002 Chubb ....................... B60T 1/14
                                                                303/5
(Continued)

FOREIGN PATENT DOCUMENTS

CN    101367378 A    2/2009
CN    101987617 A    3/2011
(Continued)

OTHER PUBLICATIONS

Office Action dated May 18, 2023 in corresponding Chinese Patent Application No. 202110511802.9.

*Primary Examiner* — John Kwon
*Assistant Examiner* — Johnny H Hoang
(74) *Attorney, Agent, or Firm* — NovoTechIP International PLLC

(57) ABSTRACT

A brake system and a control method therefor are disclosed. A brake system is provided including a main brake system, auxiliary brake system, signal bus, and communications unit. The main brake system distributes braking force to each of vehicle wheels. The auxiliary brake system operates in place of the main brake system when having a malfunction. The signal bus includes wired device(s) arranged between the main brake system and the auxiliary brake system and transmits a signal regarding a presence or absence of malfunction between the main brake system and auxiliary brake system. The communications unit transmits operation state information between the main brake system and the auxiliary brake system. Responsive to the detected malfunction signal of the main brake system through the signal bus, the auxiliary brake system performs a preparation for providing the braking force to each vehicle wheel.

14 Claims, 4 Drawing Sheets

(58) Field of Classification Search
CPC ........ B60T 2270/402; B60T 2270/413; B60W 10/06; B60W 10/08; B60W 50/02
See application file for complete search history.

(56) References Cited

U.S. PATENT DOCUMENTS

| | | | |
|---|---|---|---|
| 2009/0045672 A1* | 2/2009 | Nishino | B60T 8/88 303/113.3 |
| 2014/0015310 A1* | 1/2014 | Hanzawa | B60T 17/22 303/3 |
| 2019/0016321 A1* | 1/2019 | Dinkel | B60T 13/62 |
| 2019/0100218 A1* | 4/2019 | Kim | B60T 13/686 |
| 2020/0406880 A1* | 12/2020 | Zimmermann | B60T 17/221 |
| 2021/0101575 A1* | 4/2021 | Ahn | B60T 13/683 |
| 2021/0155215 A1* | 5/2021 | Ganzel | B60T 11/20 |
| 2021/0394728 A1* | 12/2021 | Yoo | B60T 13/662 |

FOREIGN PATENT DOCUMENTS

| | | |
|---|---|---|
| CN | 102050102 A | 5/2011 |
| CN | 106458192 A | 2/2017 |
| CN | 110603178 A | 12/2019 |

\* cited by examiner

VEHICLE BRAKE SYSTEM AND METHOD OF OPERATING THEREOF

CROSS-REFERENCE TO RELATED APPLICATIONS

This application is based on, and claims priority from, Korean Patent Application Number 10-2020-0055788, filed May 11, 2020, the disclosure of which is incorporated by reference herein in its entirety.

TECHNICAL FIELD

The present disclosure in some embodiments relates to a brake system and a control method therefor.

BACKGROUND

The statements in this section merely provide background information related to the present disclosure and do not necessarily constitute prior art.

With the increasingly active development of autonomous driving technology of vehicles, an issue is emerging regarding the driving stability of autonomous vehicles. While driving an autonomous vehicle, the risk of an accident increases when an abnormality occurs at the brake system during a deceleration or braking situation.

As a solution in the prior art, an auxiliary brake system has been additionally installed in the vehicle in case of a problem occurred at the brake system. By general definition, the control unit of a main brake system is a Main Controller Unit (MCU), and the control unit of a auxiliary brake system is a Redundancy Controller Unit (RCU). When the MCU detects damage to the main brake system, it transmits damage information to the RCU through Controller Area Network (CAN) communications of the vehicle. Accordingly, the RCU takes over the control over vehicle brake systems from the MCU and engages in the vehicle braking. With such a brake system and a control method, a redundancy can be secured in the braking performance of the vehicle.

However, the prior art involves a delay occurring in the backup time of the RCU by the MCU transmitting the malfunction notice to the RCU through CAN communications. The CAN communications generally have a communication period of 10 ms. The MCU takes 20 ms to notify the RCU of a malfunction signal and transfer control. Therefore, during the 20 ms period, the main brake system remains in a blank time to operate abnormally, while the auxiliary brake system is granted no transfer of control right. When the vehicle is running at high speeds, the 20-ms blank could be fatal to the safety of the drivers.

SUMMARY

According to at least one embodiment, the present disclosure provides a brake system, including a main brake system, an auxiliary brake system, a signal bus, and a communications unit. The main brake system is configured and arranged to provide a braking force to each of the wheels of the vehicle. The auxiliary brake system is configured and arranged to operate in place of the main brake system in case of a malfunction at the main brake system. The signal bus includes at least one or more wired devices arranged between the main brake system and the auxiliary brake system and is configured to transmit a signal indicating a presence or absence of a malfunction between the main brake system and the auxiliary brake system. The communications unit is configured and arranged to transmit and receive operation state information between the main brake system and the auxiliary brake system. Here, the auxiliary brake system is responsive to a detection of a malfunction signal of the main brake system through the signal bus for performing a preparation for providing the braking force to each the wheels of the vehicle.

According to another embodiment, the present disclosure provides a method of controlling a brake system for a vehicle, including detecting a malfunction of a main brake system by a control unit of the main brake system, and transmitting information by a digital signal on the malfunction when determined to occur at the main brake system to an auxiliary brake system, and performing a preparation by the auxiliary brake system upon receiving the digital signal to provide a braking force to each of wheels of the vehicle, and transmitting information on a cause of the malfunction of the main brake system to the auxiliary brake system, and receiving a transfer of control by the auxiliary brake system over providing the braking force from the main brake system when determined to have lost a braking function.

DETAILED DESCRIPTION

Figure 1:
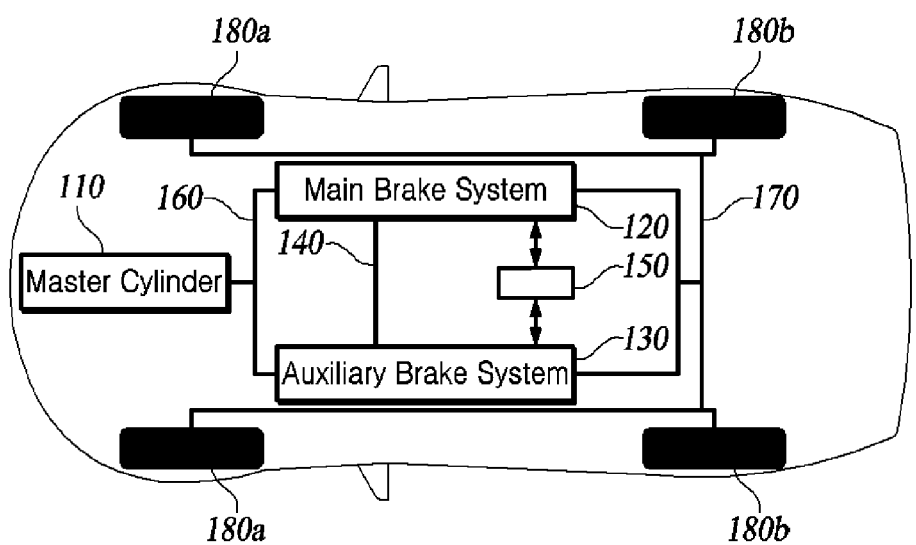
FIG. 1 is a schematic diagram of a brake system according to at least one embodiment of the present disclosure.

Accordingly, the present disclosure in at least one embodiment seeks to improve the backup performance of an auxiliary brake system in a brake system.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., are used in describing components solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a schematic diagram of a brake system according to at least one embodiment of the present disclosure.

As shown in FIG. 1, the brake system may include all or some of a master cylinder 110, a main brake or main brake system 120, an auxiliary brake or auxiliary brake system 130, and a signal bus 140, a communications unit 150, a first flow path 160, a second flow path 170, and vehicle wheels 180a, 180b.

The master cylinder 110 is configured to have at least one chamber to generate hydraulic pressure. The master cylinder 110 is a device that discharges a brake fluid by generating hydraulic pressure.

The first flow path 160 is a passage through which the brake fluid moves between the master cylinder 110 and the main brake system 120 and between the master cylinder 110 and the auxiliary brake system 130. Unlike FIG. 1 in which the main brake system 120 and the auxiliary brake system 130 are arranged in parallel, they may be connected in series. In this case, the first flow path 160 is disposed only between the master cylinder 110 and the main brake system 120.

The second flow path 170 is a passage for providing the hydraulic pressure generated from the main brake system 120 and the auxiliary brake system 130 to each of the vehicle wheels 180a, 180b. The second flow path 170 shown in FIG. 1 is schematically illustrated to express the flow of hydraulic pressure and is not limited to the illustrated arrangement of FIG. 1.

The signal bus 140 is disposed between the main brake system 120 and the auxiliary brake system 130 and includes one or more conductors adapted to transmit digital signals indicating the presence or absence of a malfunction between the main brake system 120 and the auxiliary brake system 130. The digital signals include a first signal (High) and a second signal (Low).

For example, in its normal operation, the main brake system 120 transmits the first signal to the auxiliary brake system 130 through the signal bus 140. When the main brake system 120 has its power turned off, the second signal is transmitted to the auxiliary brake system 130 on the contrary. Using these signals, the main brake system 120 and the auxiliary brake system 130 may monitor each other. It takes less than 1 ms to transmit the first signal and the second signal.

The communications unit 150 is arranged to transmit and receive operation state information to and from the main brake system 120 and the auxiliary brake system 130. The communications unit 150 may use Controller Area Network (CAN) communication. The communications unit 150 serves to transmit and receive signals between the main brake system 120 and the auxiliary brake system 130 as well as between components requiring communication in the vehicle.

In general, the signal transmission period of the communications unit 150 is about 10 ms. For example, when an abnormal situation occurs at the main brake system 120, the main brake system 120 may notify the auxiliary brake system 130 of the abnormal situation through CAN communication and transmit a signal for transferring the control right of the braking of the brake system to the auxiliary brake system 130, which will take about 20 ms.

The main brake system 120 is arranged to provide a braking force to the respective vehicle wheels. The main brake system 120 receives an electrical signal from an input of a brake pedal and generates hydraulic pressure in a fluid through a mechanical operation. The main brake system 120 may perform functions of an anti-lock brake system (ABS), electric stability control (ESC), and the like, which are safe driving functions while controlling the hydraulic pressure provided to the respective vehicle wheels individually.

The main brake system 120 includes all or some of a hydraulic pump, an electric motor arranged to drive the hydraulic pump, a hydraulic module arranged to provide a hydraulic pressure to the respective vehicle wheels, and a control unit. Configurations of the main brake system 120 are well known and will not be reiterated herein. The main brake system 120 is responsive to an abnormality occurred at any one of the components of the main brake system 120 such as the hydraulic pump, electric motor, and control unit for transmitting a malfunction signal to the auxiliary brake system 130 through the signal bus 140.

Even when the main brake system 120 determines that no abnormality is present in the hydraulic pump, electric motor, hydraulic module, and control unit, it self-monitors when the main brake system 120 fails to effect the vehicle deceleration equal to or more than a preset value to transmit a malfunction signal to the auxiliary brake system 130 through the signal bus 140. For example, the main brake system 120 having normal performance generates a deceleration of more than 6.5 in/s$^2$ (about 0.65 times the gravitational acceleration) when the vehicle is decelerated. When the main brake system 120 cannot generate the deceleration greater than 6.5 in/s$^2$, the auxiliary brake system 130 needs to quickly perform as a backup to the main brake system 120.

Even after determining that the hydraulic pump, electric motor, hydraulic module, and control unit have no abnormality, the main brake system 120 may still detect possible impairment of the ABS and ESC functions, when the main brake system 120 similarly delivers a malfunction signal to the auxiliary brake system 130.

The auxiliary brake system 130 is arranged to operate in place of the main brake system 120 when a malfunction occurs at the main brake system 120. The auxiliary brake system 130 may be arranged in parallel as shown in FIG. 1 but is not limited to that arrangement, and it may also be arranged in series with the main brake system 120.

The auxiliary brake system 130 is not limited to the method of sharing the second flow path 170 with the main brake system 120 as shown in FIG. 1, and it may have a separate brake mechanism arranged other than the main brake system 120. For example, the auxiliary brake system 130 may provide a braking force to the respective vehicle wheels 180 with a separate flow path arranged independently from the second flow path 170.

The auxiliary brake system 130 may have functions and performance equivalent to the main brake system 120. The auxiliary brake system 130 may have a minimum function for maintaining safety in case of an emergency such as an inability to operate the main brake system 120, for example, a function of controlling to perform only the braking on the front wheels 180a by generating hydraulic pressure exclusively on the front wheels 180a. Alternatively, the auxiliary brake system 130 may have the function of controlling not only the front wheels 180a but also the rear wheels 180b of the vehicle.

When a malfunction occurs, the main brake system 120 primarily transmits a signal to the auxiliary brake system 130 using the signal bus 140. When any one of the components of the main brake system 120 fails in the driving or braking situation of the vehicle, the main brake system 120 transmits a second signal to the auxiliary brake system 130. In sum, when the main brake system 120 operates normally, it transmits the first signal, whereas when the main brake system 120 sustains a malfunction, it transmits the second signal to the auxiliary brake system 130. Using these signals, the auxiliary brake system 130 may continuously monitor the state of the main brake system 120.

When the auxiliary brake system 130 detects a malfunction state of the main brake system 120 through the signal bus 140, the auxiliary brake system 130 makes a preparation to provide a braking force to the respective vehicle wheels 180 before it receives control of the brake system transferred from the main brake system 120. For example, the preparation may include generating hydraulic pressure in advance by the auxiliary brake system 130.

Once the auxiliary brake system 130 receives the operation state information indicating the cause of the malfunction of the main brake system 120 through the communications unit 150, the brake system control right of the main brake system 120 is transferred to the auxiliary brake system 130. With the control right transferred, the auxiliary brake system 130 serves to provide a braking force to the respective vehicle wheels in place of the main brake system 120. In other words, the auxiliary brake system 130 controls the brake system of the vehicle.

Figure 2:
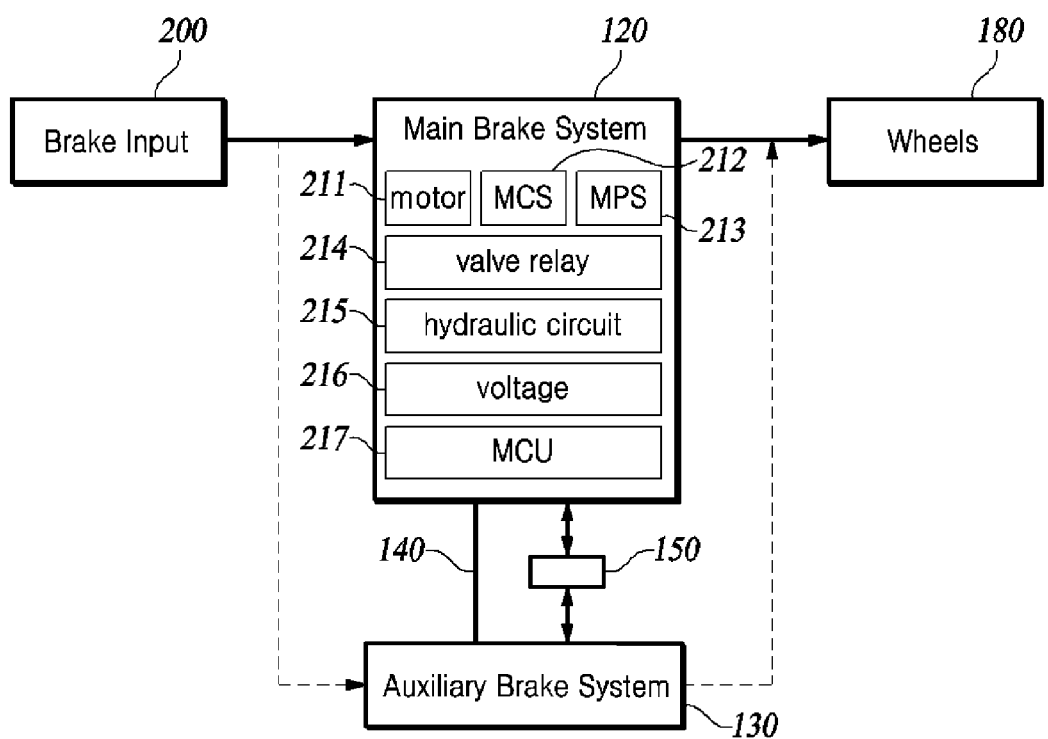
FIG. 2 is a block diagram of a brake system for a vehicle when operating normally, according to at least one embodiment of the present disclosure.
Figure 3:
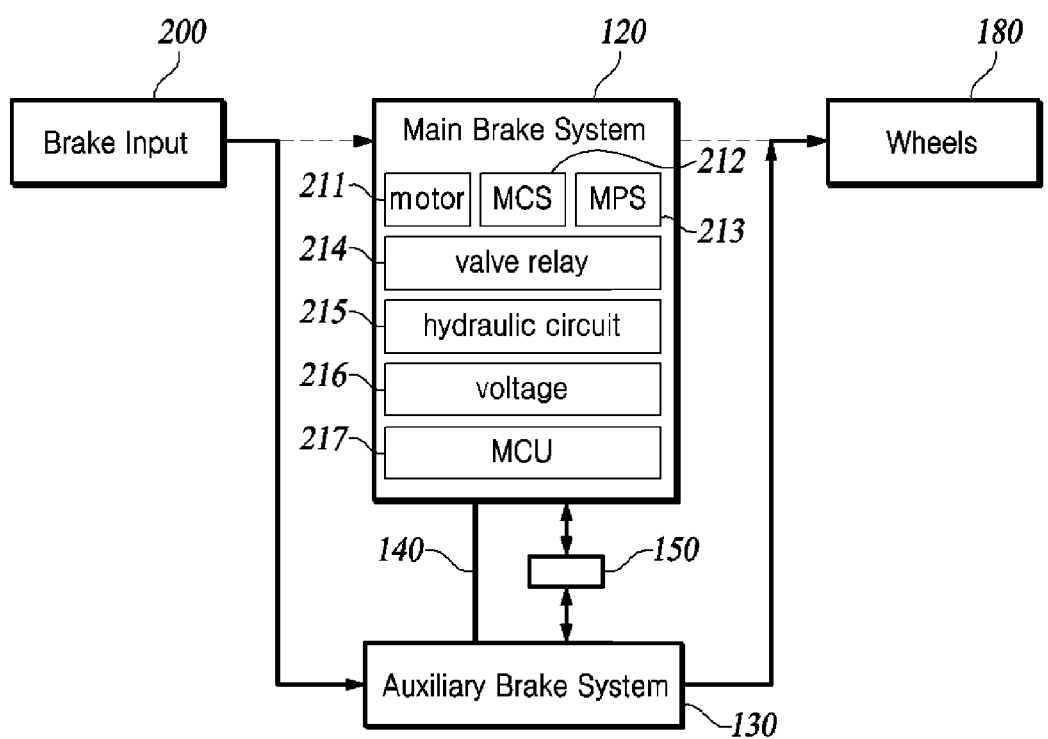
FIG. 3 is a block diagram of a brake system for a vehicle with a malfunctioning main brake system, according to at least one embodiment of the present disclosure.

FIG. 2 is a block diagram of a brake system when operating normally, according to at least one embodiment of the present disclosure. FIG. 3 is a block diagram of a brake system with a main brake system sustaining a malfunction, according to at least one embodiment of the present disclosure.

As shown in FIG. 2, once generated by the driver or by an autonomous driving signal, a braking input 200 is delivered to a main brake system 120 or an auxiliary brake system 130. Responsive to the braking input 200, the main brake system 120 or the auxiliary brake system 130 controls the respective vehicle wheels by providing a braking force thereto. In general, the main brake system 120 while sustaining no abnormality exclusively receives the braking input 200.

The main brake system 120 transmits a malfunction signal to the auxiliary brake system 130 in response to an abnormality of the main brake system 120 at any of its components of a motor 211, a motor current sensor (MCP) 212, motor position sensor (MPS) 213, a valve relay 214, a hydraulic circuit 215, a source voltage 216, and a main controller unit (MCU) 217.

In particular, whether the main brake system 120 has lost the safe driving function such as ABS and ESC is determined by further determining the presence or absence of a malfunction of a wheel slip sensor (WSS).

The source voltage 216 may sustain abnormalities such as shutdown or a low voltage state. When the source voltage 216 is shut down, the second signal is automatically transmitted to the auxiliary brake system 130, and in the case of a low voltage, the MCU 217 detects the same and similarly transmits the second signal to the auxiliary brake system 130.

Methods of determining a malfunction include determining a signal base when exceeding a preset threshold value, determining no signal being received from a sensor for a predetermined time or longer, and/or comparing several signal values to pinpoint an outlier value occurring in any one signal alone and thereby determining a malfunction state.

The auxiliary brake system 130 starts preparation upon receiving a malfunction occurrence signal indicating the malfunction of the main brake system 120 through the signal bus 140. While the auxiliary brake system 130 performs the preparation, the braking input 200 is held from being transmitted to the auxiliary brake system 130.

As shown in FIG. 3, the braking input 200 is delivered to the auxiliary brake system 130 only after the latter receives the operation state information indicating the cause of the malfunction of the main brake system 120 through the communications unit 150 and the brake system control right of the main brake system 120 transferred to the auxiliary brake system 130.

In this way, the brake system for a vehicle according to at least one embodiment of the present disclosure advances or expedites the backup preparation time of the auxiliary brake system 130 by using the signal bus 140 having a higher transmission speed than the communications unit 150. This improvement of the backup function helps the driver to more safely drive the vehicle when running at high speed, and in particular, has the effect of increasing the stability of an autonomous vehicle.

Figure 4:
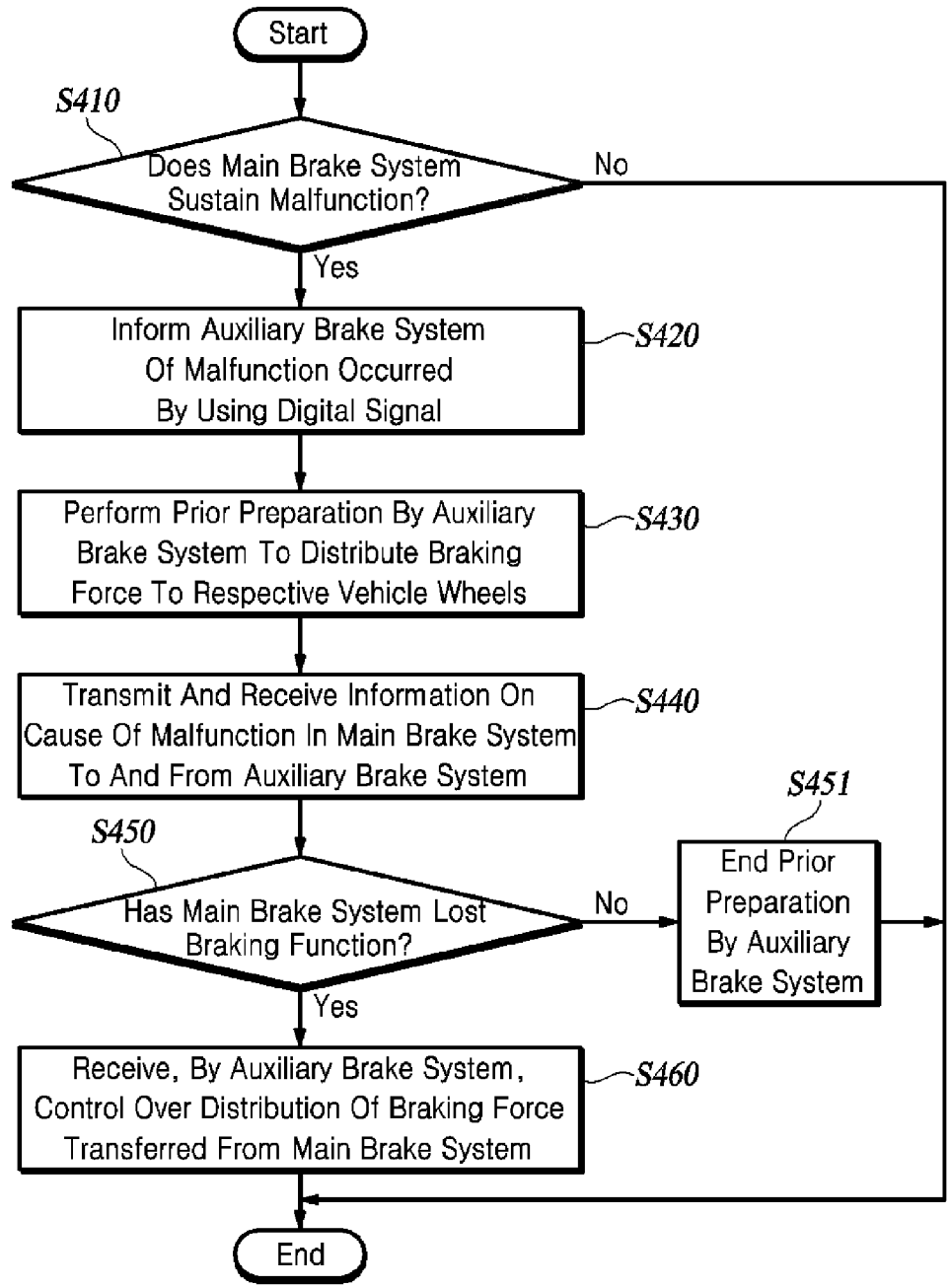
FIG. 4 is a flowchart of a control method of a brake system, according to at least one embodiment of the present disclosure.

FIG. 4 is a flowchart of a control method of a brake system according to at least one embodiment of the present disclosure.

As shown in FIG. 4, a control method of a brake system may roughly include six process steps.

The first step determines whether a malfunction occurs at some of the components of the main brake system 120 (S410). The main brake system 120 performs determining of a malfunction occurred at the main brake system 120 by determining when an abnormality has occurred at some of the components of the main brake system 120, when the main brake system 120 fails to exhibit a braking ability equivalent to a deceleration rate higher than a preset value, or when the brake system 120 has lost its function to the extent that it cannot perform the ABS and ESC functions. When no malfunction occurs in the main brake system 120, the redundancy control is terminated.

When the main brake system 120 determines that it sustains a malfunction, it utilizes a digital signal for informing the auxiliary brake system 130 of the malfunction occurred (S420). The digital signal is composed of two signals, High and Low, of which the Low signal, for example, is transmitted to the auxiliary brake system 130 in response to the occurrence of a malfunction of the main brake system 120. With the digital signal used alone, the auxiliary brake system 130 only recognizes whether or not the main brake system 120 has malfunctioned without knowing the exact cause of the malfunction at the main brake system 120.

The auxiliary brake system 130 performs a preparation to provide the braking force to the respective vehicle wheels (S430). The time when the auxiliary brake system 130 receives the cause of the malfunction through the communications unit 150 and starts generating wheel hydraulic pressure is conventionally 20 ms after the main brake system 120 malfunctions. However, the auxiliary brake system 130 receives a malfunction signal in a short time within 1 ms through the signal bus 140 that is directly wired between the main brake system 120 and the auxiliary brake system 130, which allows the auxiliary brake system 130 to make the preparation faster than ever.

The main brake system 120 transmits a signal containing the operation state information indicating the cause of the malfunction at the main brake system 120 to the auxiliary brake system 130 through the communications unit 150 (S440). Based on the operation state information transmitted through the communications unit 150, the auxiliary brake system 130 determines whether the main brake system 120 can exhibit a normal braking function with an abnormality occurred at the main brake system 120 (S450). Upon determining that the main brake system 120 has not lost the braking function, the auxiliary brake system 130 cancels the preparation and ends the control (S451).

Upon determining that the main brake system 120 has lost the braking function, the auxiliary brake system 130 receives control over providing the braking force transferred from the main brake system 120 (S460). In other words, the auxiliary brake system 130 controls the brake system.

With this method of controlling a brake system for a vehicle, the backup performance of the auxiliary brake system 130 is accelerated to exhibit a better backup function than the prior art. At least one embodiment of the present disclosure when particularly applied to an autonomous vehicle can improve the safety of the vehicle occupants by improving the braking redundancy.

As described above, according to some embodiments of the present disclosure, the brake system for a vehicle and the control method therefor enable the auxiliary brake system to utilize the signal bus for detecting malfunction of the main brake system in a time shorter than ever before realized, thereby securing the vehicular redundancy.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A brake system comprising:
   a main brake system having a control over providing a braking force to a wheel of a vehicle;
   an auxiliary brake system configured to provide the braking force to the wheel upon a malfunction at the main brake system;
   a signal bus extending between the main and auxiliary brake systems and configured to transmit, between the main and auxiliary brake systems, a malfunction status signal indicating a presence or absence of the malfunction at the main brake system; and
   a communications unit configured to transmit and receive, between the main and auxiliary brake systems, operation state information indicating a cause of the malfunction at the main brake system,
   wherein the auxiliary brake system is configured to perform:
      detecting, based on the malfunction status signal transmitted via the signal bus, the presence of the malfunction at the main brake system;
      in response to detecting the presence of the malfunction at the main brake system, preparing to provide the braking force to the wheel;
      after starting preparing to provide the braking force to the wheel, determining, based on the operation state information transmitted from the communication unit, whether the main brake system has lost a braking function; and
      in response to determining that the main brake system has lost the braking function, taking over, from the main brake system, the control over providing the braking force to the wheel.

2. The brake system of claim 1, wherein the malfunction at the main brake system comprises:
   the main brake system being unable to provide the braking force for exerting a deceleration effect equal to or greater than a preset value onto the wheel; or
   the main brake system being unable to operate an anti-lock brake system (ABS) or electronic stability control (ESC).

3. The brake system of claim 1, wherein the main brake system comprises:
   a hydraulic pump;
   an electric motor configured to drive the hydraulic pump;
   a hydraulic module configured to provide a hydraulic pressure to the wheel; and
   a control unit.

4. The brake system of claim 3, wherein the malfunction at the main brake system comprises a malfunction of at least one of the electric motor, hydraulic module and control unit.

5. The brake system of claim 1, wherein:
   the main brake system comprises a motor, motor current sensor (MCS), motor position sensor (MPS), valve relay, hydraulic circuit, source voltage and main controller unit, and
   the malfunction at the main brake system comprises a malfunction of at least one of the motor, MCS, the valve relay, hydraulic circuit, source voltage and main controller unit.

6. The brake system of claim 1, wherein, for preparing to provide the braking force to the wheel, the auxiliary brake system is configured to perform replenishing a brake fluid.

7. The brake system of claim 1, wherein:
   the wheel comprises front and rear wheels, and
   for providing the braking force to the wheel, the auxiliary brake system is configured to provide the braking force to at least one of the front and rear wheels.

8. The brake system of claim 1, wherein the malfunction status signal transmitted from the main brake system to the auxiliary brake system includes:
   a first signal indicating an absence of the malfunction at the main brake system; and
   a second signal indicating a presence of the malfunction at the main brake system.

9. The brake system of claim 1, wherein the communications unit is configured to cause the main brake system to autonomously transmit the operation state information.

10. A method of operating an auxiliary brake system of a vehicle, the vehicle including a main brake system having a control over providing a braking force to a wheel of the vehicle, the method comprising:
    receiving a malfunction status signal indicating a presence or absence of a malfunction at the main brake system;
    detecting, based on the received malfunction status signal, the presence of the malfunction at the main brake system;
    in response to detecting the presence of the malfunction at the main brake system, preparing to provide the braking force to the wheel;
    receiving operation state information indicating a cause of the malfunction at the main brake system;
    after starting preparing to provide the braking force to the wheel, determining, based on the received operation state information, whether the main brake system has lost a braking function; and
    in response to determining that the main brake system has lost the braking function, taking over, from the main brake system, the control over providing the braking force to the wheel.

11. The method of claim 10, wherein the malfunction at the main brake system comprises:
    the main brake system being unable to provide the braking force for exerting a deceleration effect equal to or greater than a preset value onto the wheel; or
    the main brake system being unable to operate an anti-lock brake system (ABS) or electronic stability control (ESC).

12. The method of claim 10, wherein:
the main brake system comprises a hydraulic pump, an electric motor configured to drive the hydraulic pump, and a hydraulic module configured to provide a hydraulic pressure to the wheel, and
the malfunction at the main brake system comprises a malfunction of at least one of the electric motor, hydraulic module and control unit.

13. The method of claim 10, wherein preparing to provide the braking force to the wheel comprises replenishing a brake fluid.

14. The method of claim 10, wherein:
the wheel comprises front and rear wheels, and
providing the braking force to the wheel includes providing the braking force to at least one of the front and rear wheels.

* * * * *